United States Patent [19]
Pietersen

[11] Patent Number: 5,954,370
[45] Date of Patent: Sep. 21, 1999

[54] TUBE COUPLING WITH AXIALLY MOVABLE UNLOCKING SLIDE

[75] Inventor: John B. Pietersen, Hoogeveen, Netherlands

[73] Assignee: U.S. Philips Corporation, New York, N.Y.

[21] Appl. No.: 08/721,160

[22] Filed: Sep. 26, 1996

[30] Foreign Application Priority Data

Sep. 28, 1995 [EP] European Pat. Off. .............. 95202608

[51] Int. Cl.⁶ .......................................................... A47L 9/24
[52] U.S. Cl. .................................. 285/7; 285/84; 285/316
[58] Field of Search .................................. 285/7, 84, 85, 285/81, 92, 315, 319, 308, 316, 348, 305; 15/246.2

[56] References Cited

U.S. PATENT DOCUMENTS

| | | | |
|---|---|---|---|
| 2,409,650 | 10/1946 | Wiggins | 285/173 |
| 2,461,024 | 2/1949 | Baumgardner | 285/7 |
| 2,582,446 | 1/1952 | Martinet | 285/7 |
| 2,784,987 | 3/1957 | Corcoran | 285/82 |
| 3,351,363 | 11/1967 | Downey et al. | 285/303 |
| 3,684,321 | 8/1972 | Hundhausen et al. | 285/316 |
| 3,997,195 | 12/1976 | Bartholomew | 285/81 |
| 4,398,757 | 8/1983 | Floyd et al. | 285/315 |
| 5,332,266 | 7/1994 | Canale | 285/319 X |

FOREIGN PATENT DOCUMENTS

| | | |
|---|---|---|
| 0552481A1 | 7/1993 | European Pat. Off. . |
| 9213813 | 3/1994 | Germany . |
| 6-105776 | 4/1994 | Japan ......................................... 285/7 |

*Primary Examiner*—H. Shackelford
*Attorney, Agent, or Firm*—Ernestine C. Bartlett

[57] ABSTRACT

A tube coupling for use in a vacuum cleaner includes a first tubular part and a second tubular part, which parts can be coupled to and separated from one another. The first part includes a locking member which is movable from a first position, in which the locking member locks the second part relative to the first part, to a second position, in which the locking member releases the second part. The first part further comprises a slide which cooperates with the locking member, the locking member being moved to the second position if the slide is moved parallel to a longitudinal axis of the first part in a direction away from the second part. In this way, a force exerted on the slide to unlock the parts and a force exerted on the first part to separate the parts from one another are oriented in the same direction, as a result of which the tube coupling is very easy to handle. In a special embodiment the slide of the tube coupling is a grip held by the user when the parts are to be uncoupled. The user then exerts both the force necessary to unlock the parts and the force necessary to separate the parts on the slide, so that the parts are separable by one continuous movement of the hand of the user.

9 Claims, 4 Drawing Sheets

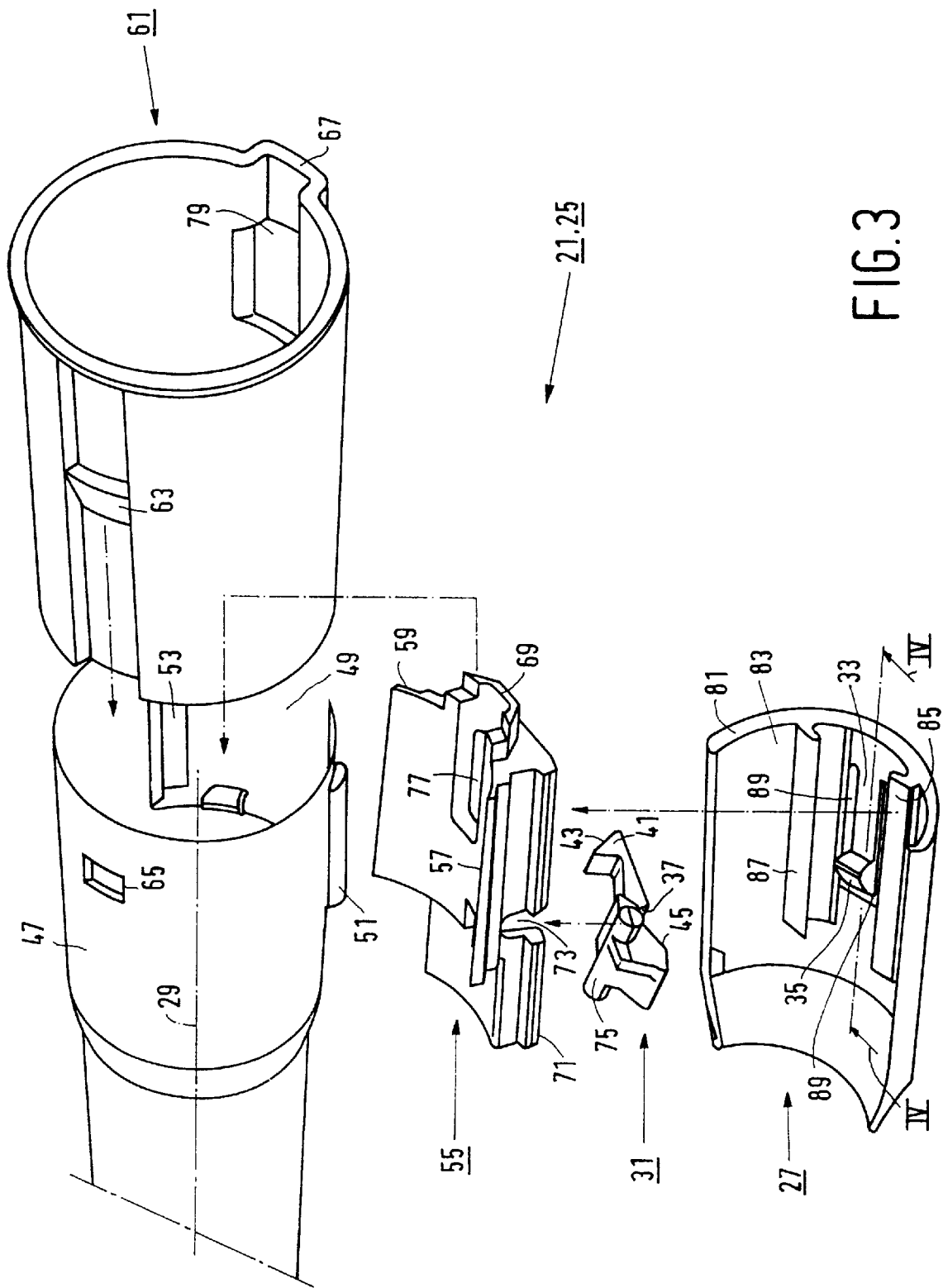

TUBE COUPLING WITH AXIALLY MOVABLE UNLOCKING SLIDE

BACKGROUND OF THE INVENTION

1. Field of the Invention

The invention relates to a tube coupling comprising a first tubular part and a second tubular part, which parts can be coupled to and separated from one another, the first part comprising a locking member which is movable from a first position, in which the locking member locks the second part relative to the first part, to a second position, in which the locking member releases the second part.

The invention further relates to a tubular part suitable for use as a first tubular part in a tube coupling in accordance with the invention.

The invention also relates to a vacuum cleaner comprising a housing, a suction unit accommodated in the housing, and a suction attachment which can be coupled to the housing via a suction tube and a suction hose, the suction tube comprising at least a first tubular part and a second tubular part, which tubular parts can be coupled to and separated from one another.

The invention moreover relates to a suction tube suitable for use in a vacuum cleaner in accordance with the invention.

2. Description of Related Art

A tube coupling of the type defined in the opening paragraph is known from DE-G-92 13 813. The locking member of the first tubular part of the known tube coupling is a lever which is pivotably mounted in a plastics sleeve of the first part by means of two elastically deformable joints, which constitute a pivot of the lever and which are formed by cut-outs in the sleeve. The lever comprises a first arm with a locking projection and a second arm which is bent relative to the first arm and which forms an actuating knob of the tube coupling. The first part and the second part of the known tube coupling are coupled to one another by inserting the second part into the first part, as a result of which the locking projection of the lever engages a recess in the second part under elastic deformation of the pivot of the lever and the second part is locked relative to the first part. The first part and the second part of the known tube coupling are separated from one another by pressing the actuating knob in a direction perpendicular to a longitudinal axis of the first part, as a result of which the lever is pivoted about the pivot and the locking projection is disengaged from the recess of the second part, and by subsequently sliding the second part out of the first part.

A disadvantage of the known tube coupling is that in order to uncouple the two parts a user should exert a force on the actuating knob, which force is necessary to unlock the two parts and is directed perpendicularly to the longitudinal axis of the first part, and at the same time two mutually opposed forces on the two parts, which forces are necessary to disengage the two parts from one another and are directed parallel to the longitudinal axis of the first part.

SUMMARY OF THE INVENTION

It is an object of the invention to provide a tube coupling of the type defined in the opening paragraph, wherein uncoupling of the two parts is simplified, so that the tube coupling is more convenient to handle.

To this end, the invention is characterized in that the first part comprises a slide which is movable parallel to a longitudinal axis of the first part and which cooperates with the locking member, a movement of the slide in a direction away from the second part corresponding to a movement of the locking member from the first position to the second position. By the use of said slide the two parts of the tube coupling are unlocked by moving the slide parallel to the longitudinal axis of the first part in the direction away from the second part. This direction corresponds to a direction in which a force is exerted on the first part in order to remove the two parts from one another, so that the forces exerted on the first part to separate the two parts, i.e. to unlock the two parts and remove them from one another, are oriented in the same direction. This simplifies uncoupling of the two parts and makes the tube coupling more convenient to handle.

A special embodiment of a tube coupling in accordance with the invention is characterized in that the slide comprises a grip of the first part. Since the slide comprises a grip of the first part, a user takes hold of the slide when the two parts are to be uncoupled. To uncouple the two parts only one force has to be exerted on the slide by the user, which force is directed parallel to the longitudinal axis of the first part and serves both for unlocking and for separating the two parts. The two parts are thus separable by one continuous movement of the hand of the user, as a result of which the ease of handling of the tube coupling is further improved.

A further embodiment of the tube coupling in accordance with the invention is characterized in that the locking member is mounted so as to be pivotable relative to the first part and is pivotable from the first position to the second position by a movement of the slide in the direction away from the second part through cooperation between a projection of the slide and a stop of the locking member. The use of the pivotable locking member with the said stop and the slide with the said projection results in a tube coupling of particularly simple construction.

Yet another embodiment of a tube coupling in accordance with the invention is characterized in that the first part comprises an elastically deformable element which exerts an elastic preloading force on the slide, which force is directed towards the second part. If the user does not actuate the slide, the slide assumes a position in which it faces the second part under the influence of said preloading force of the elastically deformable element, which position corresponds to a locked condition of the two parts of the tube coupling. This results in a higher reliability of the tube coupling.

A special embodiment of a tube coupling in accordance with the invention is characterized in that said element is a mechanical spring mounted under preload between the first part and the slide. The use of the mechanical spring simplifies the construction of the tube coupling.

A further embodiment of a tube coupling in accordance with the invention is characterized in that said element is an elastically deformable tongue which belongs to the slide and which carries the projection, whereby in a position of the slide in which it faces the second part, the projection engages against a first stop of the locking member under the influence of an elastic preloading force of the tongue and the locking member occupies the first position under the influence of the preloading force of the tongue, whereas in a position of the slide in which it is remote from the second part the projection engages against a second stop of the locking member under the influence of the preloading force of the tongue, which second stop is inclined relative to the longitudinal axis of the first part. In the position of the slide in which it faces the second part the locking member is held in the first position under the influence of said preloading force by cooperation of the projection with the first stop. In the position of the slide in which it is remote from the second part the locking member is held in the second position under the influence of said preloading force by cooperation of the projection with the second stop. This yields a reliable operation of the tube coupling. Since the second stop is inclined relative to the longitudinal axis of the first part, the projection slides over the second stop back to the first stop under the influence of said preloading force if the user releases the slide, as a result of which the slide resumes the position in which it faces the second part and the locking member resumes the first position. In this way the elastically deformable tongue serves a dual purpose, resulting in a simple and reliable construction of the tube coupling.

Still another embodiment of a tube coupling in accordance with the invention is characterized in that the projection is integral with the tongue, the tongue being formed by a cut-out portion in the slide. In this embodiment the slide, the tongue and the projection form a single integrated part of the tube coupling, which part can be manufactured by means of, for example, an injection-molding process.

According to the invention a vacuum cleaner of the type defined in the introductory part, is characterized in that the first part and the second part of the suction tube can be coupled by means of a tube coupling in accordance with the invention. The favorable features of the tube coupling in accordance with the invention described in the foregoing are particularly manifest in the vacuum cleaner in accordance with the invention.

BRIEF DESCRIPTION OF THE DRAWINGS

The invention will be described in more detail hereinafter with reference to the drawings, in which FIG. 3 shows some elements of a first tubular part of the tube coupling of the vacuum cleaner as shown in FIG. 1.

DETAILED DESCRIPTION OF THE PREFERRED EMBODIMENTS

Figure 1:
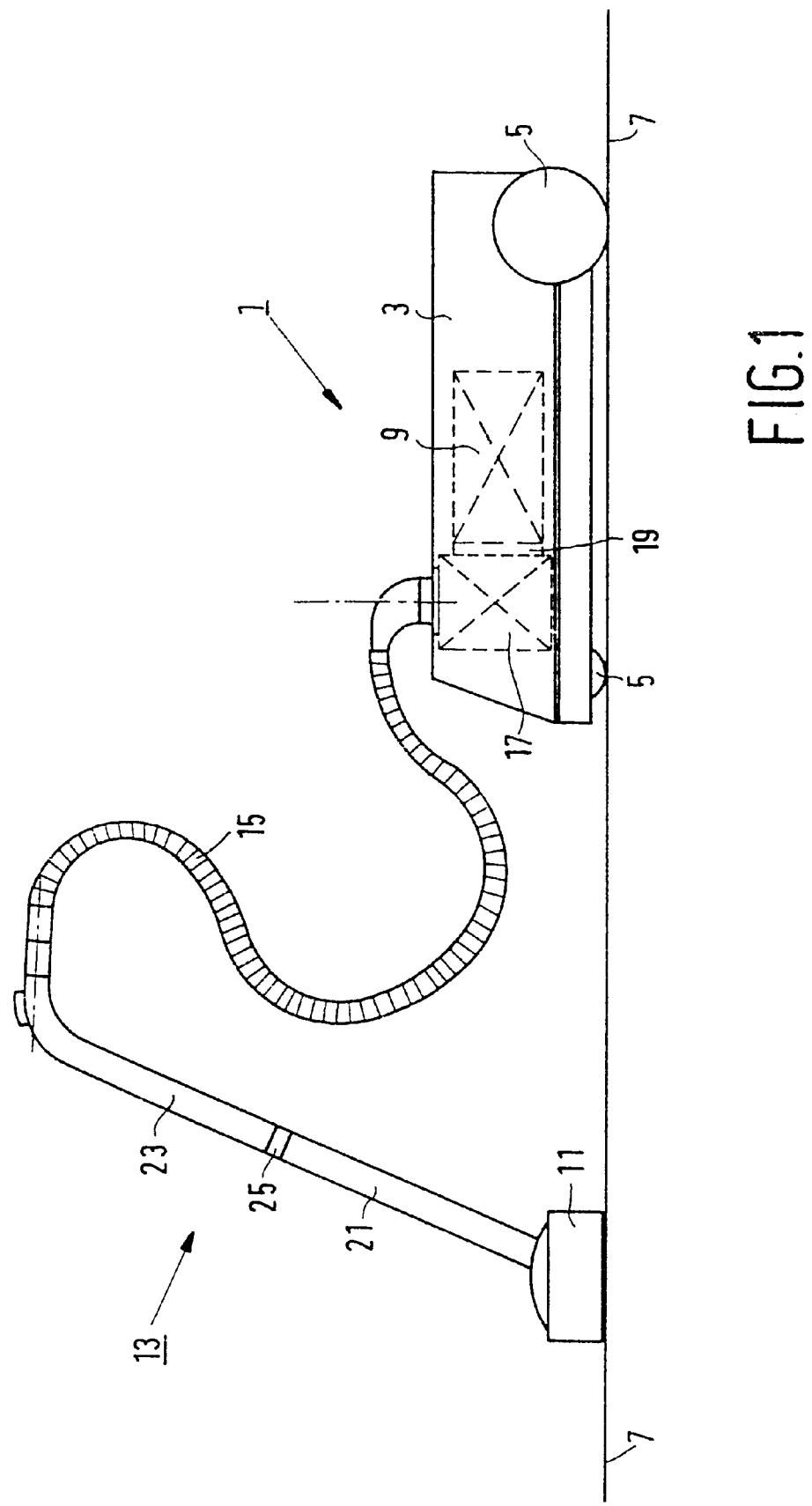
FIG. 1 shows diagrammatically a vacuum cleaner in accordance with the invention provided with a tube coupling in accordance with the invention.

A vacuum cleaner 1 in accordance with the invention shown in FIG. 1 comprises a housing 3 which is movable over a surface 7 by means of a plurality of wheels 5. The housing 3 accommodates an electrical suction unit 9, shown only diagrammatically in FIG. 1. The vacuum cleaner 1 further comprises a suction attachment 11, which is detachably coupled to the housing 3 via a suction tube 13 and a suction hose 15. The housing 3 further accommodates an exchangeable container 17 for dust and dirt particles, which is connected to the suction unit 9 via a filter 19. In operation the suction unit 9 generates a partial vacuum in the suction attachment 11, the suction tube 13, the suction hose 15 and the container 17, as a result of which dust and dirt particles on the surface 7 are drawn into the container 17 via the suction attachment 11, the suction tube 13 and the suction hose 15. As is further shown in FIG. 1, the suction tube 13 has a first tubular part 21 coupled to the suction attachment 11, and a second tubular part 23 coupled to the suction hose 15. The first part 21 and the second part 23 are detachably coupled to one another by means of a tube coupling 25 in accordance with the invention.

Figure 2A:
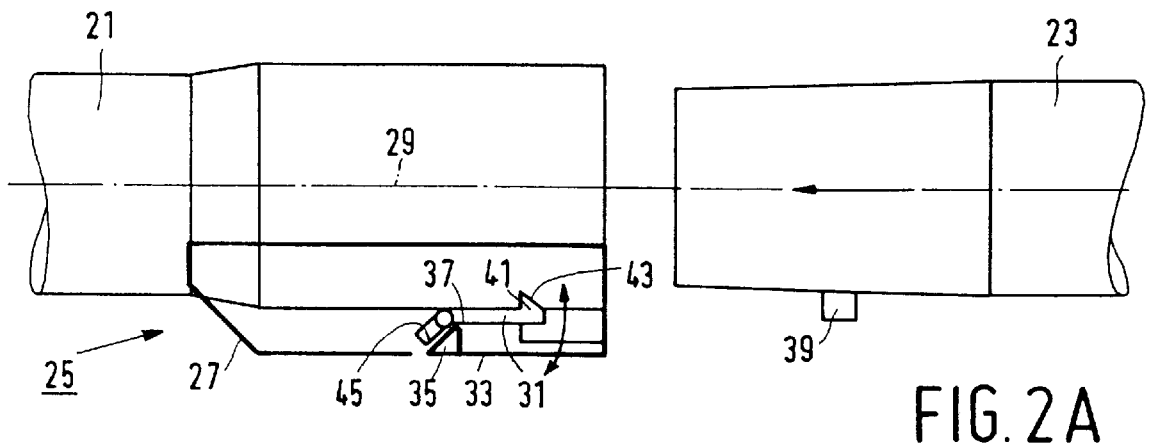
FIG. 2A shows diagrammatically the tube coupling of the vacuum cleaner in accordance with FIG. 1 in an uncoupled condition.
Figure 2B:
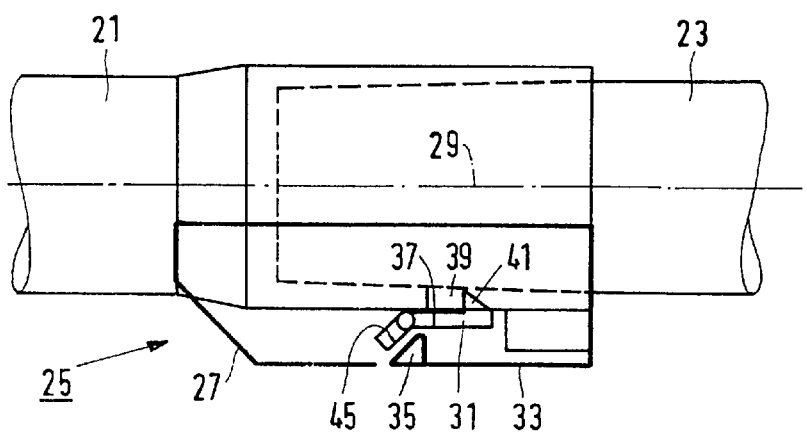
FIG. 2B shows diagrammatically the tube coupling in accordance with FIG. 2a in a coupled condition.
Figure 2C:
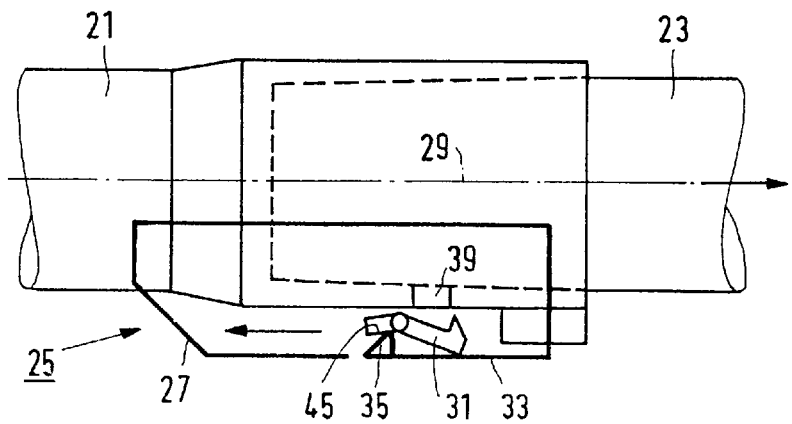
FIG. 2C shows diagrammatically the tube coupling in accordance with FIG. 2a during uncoupling.

The operation of the tube coupling 25 is first elucidated with reference to FIGS. 2a to 2c. As is shown diagrammatically in FIG. 2a, the first tubular part 21 of the tube coupling 25 comprises a slide 27, which is guided, in a manner to be described hereinafter, so as to be movable relative to the first part 21 parallel to a longitudinal axis 29 of the first part 21. The first tubular part 21 further comprises a locking member 31 which, in a manner to be described hereinafter, is mounted so as to be pivotable relative to the first part 21. The slide 27 further comprises an elastically deformable tongue 33, to be described in detail hereinafter. The tongue 33 carries a projection 35 for cooperation with the locking member 31.

In the uncoupled condition of the tube coupling 25 shown in FIG. 2a the slide 27 is in a position in which it faces the second part 23. In this position the projection 35 engages against a first stop 37 of the locking member 31 under the influence of an elastic preloading force of the tongue 33, so that the locking member 31 occupies a first position shown in FIG. 2a under the influence of said elastic preloading force. As is further shown in FIG. 2a, the second part 23 comprises a projection 39 for cooperation with a hook 41 of the locking member 31. In order to couple the first tubular part 21 and the second tubular part 23 of the tube coupling 25, the second part 23 is inserted into the first part 21. In the first position of the locking member 31 the hook 41 of the locking member 31 is situated in an insertion path of the projection 39 of the second part 23. As is shown in FIG. 2a, the hook 41 has an inclined surface 43, allowing the projection 39 of the second part 23 to move past the hook 41 during insertion of the second part 23 while the locking member 31 undergoes rotation and the tongue 33 is subject to elastic deformation. After the projection 39 has moved past the hook 41 the first part 21 and the second part 23 are in the coupled condition shown in FIG. 2b, in which the locking member 31 is again in the first position and locks the second part 23 relative to the first part 21.

In order to unlock and separate the first part 21 and the second part 23 of the tube coupling 25, the user moves the slide 27 in a direction away from the second part 23, as is shown in FIG. 2c. The projection 35 of the slide 27 then cooperates with a second stop 45 of the locking member 31, so that the locking member 31 is pivoted from the first position to a second position shown in FIG. 2c, in which the locking member 31 releases the projection 39 of the second part 23. Subsequently, the first part 21 and the second part 23 are slid apart. As is shown in FIGS. 2a to 2c, the second stop 45 of the locking member 31 is inclined with respect to the longitudinal axis 29 of the first part 21. Since in the position of the slide 27 shown in FIG. 2c, in which the slide is remote from the second part 23, the projection 35 of the slide 27 is urged against the second stop 45 under the influence of the elastic preloading force of the tongue 33, the locking member 31 is held in the second position under the influence of said elastic preloading force. Since the second stop 45 is inclined relative to the longitudinal axis 29, the projection 35 of the slide 27 slides back to the first stop 37 over the second stop 45 under the influence of the elastic preloading force of the tongue 33 if the user releases the slide 27. As a result, the slide 27 resumes the position shown in FIG. 2a, in which it faces the second part 23, while the locking member 31 returns to the first position. The elastically deformable tongue 33 of the slide 27 consequently has a double function, i.e. keeping the locking member 31 in the first and the second position, respectively, and returning the slide 27 into the position in which it faces the second part 23.

As described hereinbefore, the first part 21 and the second part 23 of the tube coupling 25 are unlocked by moving the slide 27 parallel to the longitudinal axis 29 of the first part 21 in a direction away from the second part 23. To slide the second part 23 subsequently out of the first part 21, the user exerts a force directed away from the first part 21 on the second part 23 and the user exerts a substantially equal force directed away from the second part 23 on the first part 21. Thus, the direction of the force exerted on the slide 27 by the user in order to unlock the parts 21 and 23, corresponds to the direction of the force exerted on the first part 21 by the user in order to separate the parts 21 and 23 from one another. As is shown in FIGS. 2a to 2c and is described in more detail hereinafter, the slide 27 is constructed as a grip which is held by the user when the parts 21 and 23 are uncoupled. As a result, the afore-mentioned forces necessary to unlock the parts 21 and 23 and to separate the parts 21 and 23 from one another are concurrently exerted on the slide 27 by the user, so that the uncoupling of the parts 21 and 23, i.e. unlocking and separating the parts 21 and 23, is effected by one continuous movement of the hand of the user. In this way, the tube coupling 25 in accordance with the invention is very easy to handle.

Figure 4:
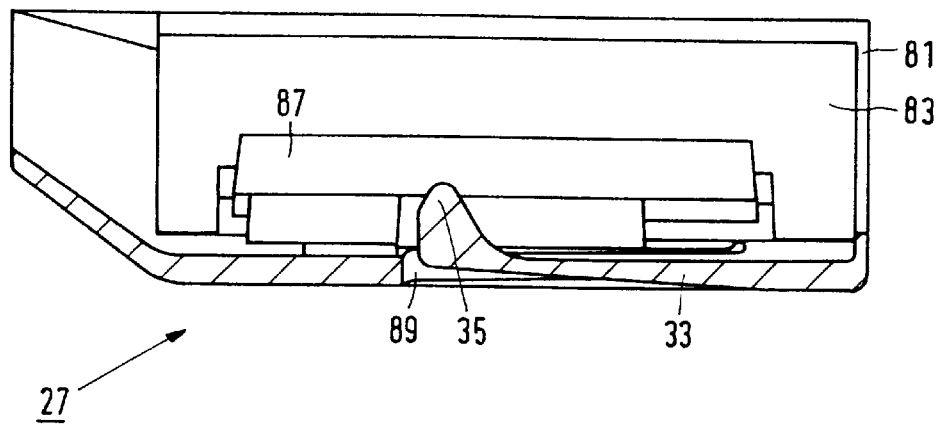
FIG. 4 shows a slide of the first tubular part in a cross-sectional view taken on the line IV—IV in FIG. 3.

The construction of the tube coupling 25 is explained with reference to FIGS. 3 and 4. FIG. 3 shows some elements of the first tubular part 21 of the tube coupling 25. The first part 21 comprises a tube end portion 47 having a wall opening 49 bounded by two flanges 51 and 53 which extend parallel to the longitudinal axis 29 of the first part 21. The tube coupling 25 further comprises an insert 55 having two parallel webs 57 and 59. As is shown in FIG. 3, the insert 55 is inserted into the wall opening 49 of the tube end portion 47 of the first part 21 during assembly of the tube coupling 25, the two webs 57 and 59 of the insert 55 engaging in the flanges 51 and 53 of the tube end portion 47. The tube coupling 25 further comprises a retaining sleeve 61, which is slid into the tube end portion 47 after the insert 55 has been mounted. The retaining sleeve 61 comprises a flexible lug 63, which engages an opening 65 in the tube end portion 47 during insertion of the retaining sleeve 61, and a projection 67, which engages a slot 69 of the insert 55 during insertion of the retaining sleeve 61. The insert 55 is thus fixed relative to the tube end portion 47 by means of the retaining sleeve 61.

The insert 55 further comprises a first flange 71 and a second flange, which is not shown in FIG. 3 and which is oriented substantially parallel to the first flange 71. The flanges 71 extend parallel to the longitudinal axis 29 of the first part 21. The first flange 71 has an opening 73 and the second flange has a similar opening, which is not visible in FIG. 3. FIG. 3 shows the locking member 31 with the hook 41 in a rotated position relative to the insert 55, so that the first stop 37 and the second stop 45 of the locking member 31 are visible. The locking member 31 comprises a trunnion 75 which, as is shown in FIG. 3, engages the openings 73 in the first and the second flange 71 of the insert 55 during assembly of the tube coupling 25. Thus, said openings 73 in the first and the second flange 71 define a pivotal axis of the locking member 31, which axis extends perpendicularly to the longitudinal axis 29. The insert 55 has a central opening 77 and the retaining sleeve 61 has an opening 79 which adjoins the opening 77 of the insert 55, the hook 41 of the locking member 31 being movable through the adjacent openings 77 and 79 by rotation of the locking member 31.

As is further shown in FIG. 3, the slide 27 comprises a semicylindrical grip 81, which has two parallel flexible L sections 85 and 87 on an inner side 83. FIG. 3 further shows the afore-mentioned elastically deformable tongue 33 of the slide 27, which tongue carries the projection 35 for cooperation with the locking member 31. FIG. 4 also shows the tongue 33 and the projection 35 in sectional view. As is shown in FIGS. 3 and 4, the tongue 33 is formed by a U-shaped cut-out portion 89 in the grip 81, the projection 35 being integral with the tongue 33. The slide 27, the tongue 33 and the projection 35 thus form a single integrated part of the tube coupling 25, which part is manufactured, for example, by means of an injection-molding process. During assembly of the tube coupling 25 the slide 27 is secured to the insert 55 by clamping the L sections 85 and 87 around the flanges 71 of the insert 55. This is possible because the L sections 85 and 87 are flexible, as already stated. The flanges 71 of the insert 55 form not only fixing elements for the slide 27 but they also form a guide along which the slide 27 is guided so as to be movable parallel to the longitudinal axis 29 of the first part 21. In a simple and reliable manner this results in the construction of the tube coupling 25, whose operation has been illustrated diagrammatically by means of FIGS. 2a to 2c.

As described hereinbefore, the projection 35 of the tube coupling 25 is urged against the locking member 31 under the influence of an elastic preloading force exerted by the tongue 33. When the user releases the slide 27, the slide 27 returns from the position remote from the second part 23 to the position facing the second part 23 under the influence of the elastic preloading force of the tongue 33. As the position in which the slide 27 faces the second part 23 corresponds to the first position of the locking member 31, in which the locking member 31 locks the second part 23 relative to the first part 21, the locked condition of the parts 21 and 23 is maintained in a reliable manner under the influence of the elastic preloading force of the tongue 33 if the user does not actuate the slide 27.

Figure 5:
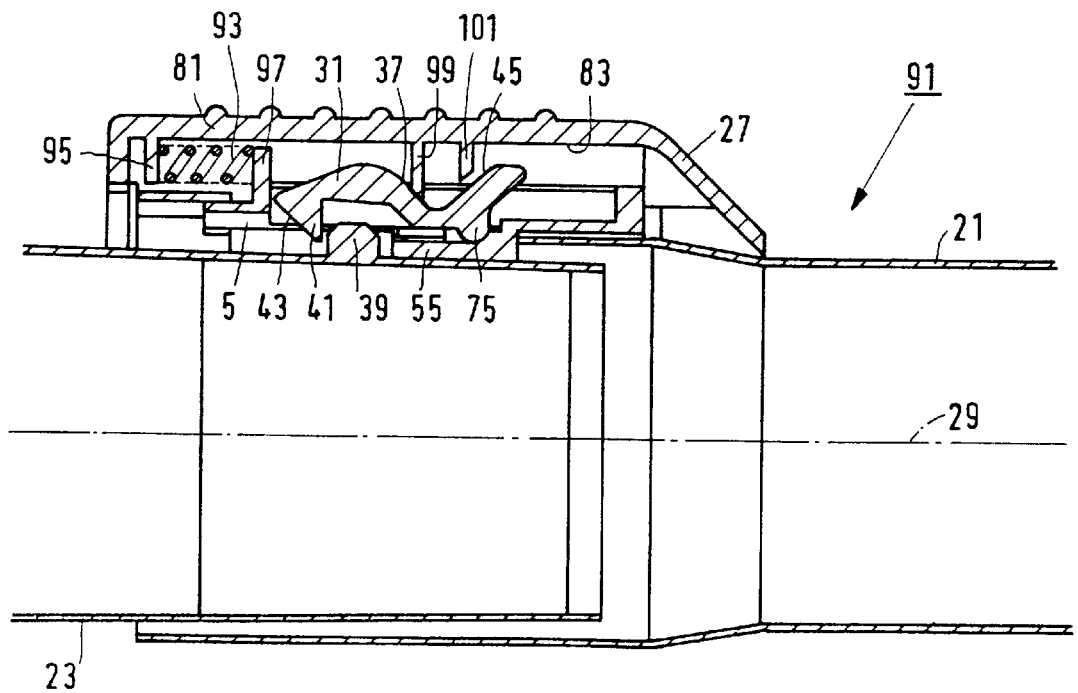
FIG. 5 shows a cross-sectional view of an alternative embodiment of a tube coupling of the vacuum cleaner as shown in FIG. 1.

In the alternative embodiment of a tube coupling 91 in accordance with the invention shown in FIG. 5 the elastic preloading force, under the influence of which the slide 27 returns to the position in which it faces the second part 23 when the user releases the slide 27, is produced by a mechanical spring 93. In FIG. 5 parts of the alternative tube coupling 91, which correspond to parts of the tube coupling 25 described above, bear the corresponding reference numerals. Hereinafter, only differences between the tube couplings 25 and 91 will be described. As is shown in FIG. 5, the mechanical spring 93 of the tube coupling 91 is mounted under preload between a partition 95, which has been provided on the inner side 83 of the slide 27, and a partition 97, which is integral with the insert 55. The mechanical spring 93 is compressed, so that under the influence of the preloading force of the mechanical spring 93 the slide 27 is held in the position facing the second part 23 when the user does not actuate the slide 27. Furthermore, a first projection 99 is present on the inner side 83 of the slide 27, which projection 99 bears against the first stop 37 of the locking member 31 in the position of the slid 27 in which the slide 27 faces the second part 23. Moreover, a second projection 101 has been provided on the inner side 83 of the slide 27, which projection 101 comes into contact with the second stop 45 of the locking member 31 if the locking member 31 is moved in the direction away from the second part 23. In this way the locking member 31 is pivoted from the first position to the second position by a movement of the slide 27 in the direction away from the second part 23. If in the position remote from the second part 23 the slide 27 is released by the user, the slide is returned to the position facing the second part 23 under the influence of the preloading force of the mechanical spring 93, the locking member 31 being returned to the first position by cooperation with the first projection 99 of the slide 27. The use of the mechanical spring 93 also results in a simple and reliable construction of the tube coupling 91.

It is to be noted that the tube coupling 25, 91 in accordance with the invention described hereinbefore can be used not only in a vacuum cleaner but also in other devices comprising tubular parts which can be coupled to and uncoupled from one another. Such devices may be, for example, detachable tubular frames.

Furthermore, it is to be noted that the tube coupling 25, 91 in accordance with the invention can also be used at other locations in the vacuum cleaner 1. In the embodiment of a vacuum cleaner 1 in accordance with the invention shown in FIG. 1 the tube coupling 25 is situated approximately halfway the suction tube 13. The tube coupling 25 can, for example, also be used for coupling the suction tube 13 to the suction attachment 11, the suction attachment 11 having a comparatively short coupling tube, or for coupling the suction tube 13 to a handle which belongs to the suction hose 15.

Finally, it is to be noted that in a tube coupling in accordance with the invention, instead of the pivotable locking member 31, another type of locking member can be used, such as for example a locking pin which is movable perpendicularly to the longitudinal axis 29 of the first part 21. When such an alternative locking member is used the slide and the locking member generally comprise other means for cooperation with one another. In the case of said locking pin which is movable perpendicularly to the longitudinal axis 29 the slide has, for example, an inclined surface against which the locking pin is urged under the influence of an elastic preloading force.

What is claimed is:

1. A tube coupling in combination with a vacuum cleaner, said tube coupling comprising:
    a first tubular part; and
    a second tubular part for being coupled to and separated from said first tubular part,
    the first tubular part comprising:
        a locking member, which when in a first position, locks the second tubular part relative to the first tubular part, and when in a second position, releases the second tubular part; and
        a slide movable parallel to a longitudinal axis of the first tubular part for contacting the locking member, said slide including a projection for contacting said locking member and comprising a grip of said first part,
    said locking member including a first stop for contacting said projection and a second stop inclined relative to a longitudinal axis of the first tubular part,
    wherein, when said slide moves away from said second tubular part, said projection contacts said second stop such that said locking member pivots from the first position to the second position.

2. A tube coupling as claimed in claim 1, wherein the first tubular part comprises an elastically deformable element for exerting an elastic preloading force on the slide, said force being directed toward the second tubular part.

3. A tube coupling as claimed in claim 2, wherein said deformable element comprises a mechanical spring mounted under preload between the first tubular part and the slide.

4. A tube coupling comprising:
    a first tubular part; and
    a second tubular part for being coupled to and separated from said first tubular part,
    the first tubular part comprising:
        a locking member, which when it is in a first position locks the second tubular part relative to the first tubular part, and when it is in a second position releases the second tubular part; and
        a slide movable parallel to a longitudinal axis of the first tubular part for contacting the locking member, said slide including a projection for contacting said locking member,
    said locking member including a first stop for contacting said projection and a second stop inclined relative to a longitudinal axis of the first tubular part, the locking member being pivotable relative to the first tubular part,
    said first tubular part including an elastically deformable element comprising an elastically deformable tongue forming a portion of the slide for supporting the projection,
    wherein, (i) when the slide faces the second tubular part and the projection contacts said first stop of the locking member under the influence of elastically deformable tongue, the locking member occupies the first position, and
    (ii) when said slide is remote from the second tubular part, the projection contacts said second stop of the locking member under the influence of the elastically deformable tongue.

5. A tube coupling as claimed in claim 4, wherein the projection is integral with the tongue, the tongue comprising a cut-out portion in the slide.

6. A tube coupling comprising:
    a first tubular part; and
    a second tubular part for being coupled to and separated from said first tubular part,
    the first tubular part comprising:
        a locking member, wherein when said locking member is in a first position, the locking member locks the second tubular part relative to the first tubular part, and when said locking member is in a second position, the locking member releases the second tubular part; and
        a slide movable parallel to a longitudinal axis of the first tubular part for contacting the locking member, wherein when the slide moves away from the second tubular part, the locking member moves from the first position to the second position,
    said slide including a projection for contacting said locking member,
    said locking member including a first stop for contacting said projection and a second stop inclined relative to a longitudinal axis of the first tubular part,
    the first tubular part further including an elastically deformable element for exerting an elastic preloading force on the projection, said force being directed toward the second tubular part,
    said deformable element comprising an elastically deformable tongue forming a portion of the slide for supporting the projection, wherein, when the slide faces the second tubular part and the projection contacts said first stop of the locking member under the influence of an elastic preloading force of the tongue, the locking member occupies the first position, and wherein, when said slide is remote from the second tubular part, the projection contacts said second stop of the locking member under the influence of the preloading force of the tongue.

7. A vacuum cleaner comprising:

a housing;

a suction unit accommodated in the housing; and a suction attachment coupled to the housing via a suction tube and a suction hose, the suction tube comprising at least a first tubular part and a second tubular part, said first tubular part being coupled to and separated from said second tubular part, such that the first tubular part and the second tubular part of the suction tube are coupled by a tube coupling, the first tubular part comprising:

a locking member, which when in a first position locks the second tubular part relative to the first tubular part, and when in a second position releases the second tubular part; and a slide, movable parallel to a longitudinal axis of the first tubular part for contacting the locking member, including a projection for contacting said locking member, and comprising a grip of said first part, said locking member including a first stop for contacting said projection and a second stop inclined relative to a longitudinal axis of the first tubular part, wherein, when the slide moves away from the second tubular part, the projection contacts said second stop such that said locking member moves from the first position to the second position.

8. A vacuum cleaner comprising:

a housing;

a suction unit accommodated in the housing; and a suction attachment coupled to the housing via a suction tube and a suction hose, the suction tube comprising at least a first tubular part and a second tubular part, said first tubular part being coupled to and separated from said second tubular part, such that the first tubular part and the second tubular part of the suction tube are coupled by a tube coupling, the first tubular part comprising:

a locking member, which when in a first position locks the second tubular part relative to the first tubular part, and when in a second position releases thus second tubular part; and a slide, movable parallel to a longitudinal axis of the first tubular part for contacting the locking member, including a projection for contacting said locking member, and comprising a grip of said first part, said locking member including a first stop for contacting said projection and a second stop inclined relative to a longitudinal axis of the first tubular part, wherein, when the slide moves away from the second tubular part, the projection contacts said second stop such that said locking member pivots from the first position to the second position.

9. A vacuum cleaner comprising:

a housing;

a suction unit accommodated in the housing; and a suction attachment coupled to the housing via a suction tube and a suction hose, the suction tube comprising at least a first tubular part and a second tubular part, said first tubular part being coupled to and separated from said second tubular part, such that the first tubular part and the second tubular part of the suction tube are coupled by a tube coupling, the first tubular part comprising:

a locking member, which when in a first position locks the second tubular part relative to the first tubular part, and when in a second position releases the second tubular part; and a slide, movable parallel to a longitudinal axis of the first tubular part for contacting the locking member, including a projection for contacting said locking member, the first tubular part having an elastically deformable element which exerts an elastic preloading force on the slide, which force is directed towards the second part, said locking member including a first stop for contacting said projection and a second stop inclined relative to a longitudinal axis of the first tubular part, the locking member being pivotable relative to said first stop, wherein, when the slide moves away from the second tubular part, the projection contacts said second stop such that said locking member moves from the first position to the second position.

* * * * *